United States Patent [19]

Bowsher

[11] Patent Number: 5,058,931
[45] Date of Patent: Oct. 22, 1991

[54] CLAMP WITH TEETH FOR GROOVED PIPES

[75] Inventor: Mark A. Bowsher, Flint, Tex.

[73] Assignee: Gustin-Bacon Division, a division of Tyler Pipe, North Swan, Tex.

[21] Appl. No.: 542,257

[22] Filed: Jun. 21, 1990

Related U.S. Application Data

[63] Continuation of Ser. No. 277,005, Nov. 28, 1988.

[51] Int. Cl.[5] .................................................. F16L 17/04
[52] U.S. Cl. .................................... 285/112; 285/373;
285/582; 285/419; 285/328
[58] Field of Search .............. 285/112, 382, 373, 419, 285/328

[56] References Cited

U.S. PATENT DOCUMENTS

| | | | |
|---|---|---|---|
| 2,473,102 | 6/1949 | Knooss | 285/112 |
| 2,778,661 | 1/1957 | Leighton | 285/373 X |
| 3,024,046 | 3/1962 | Frost et al. | 285/112 |
| 3,054,629 | 9/1962 | Piatek | 285/373 |
| 3,116,078 | 12/1963 | Scherer | 285/373 X |
| 3,251,615 | 5/1966 | Short, III | 285/112 |
| 3,351,352 | 11/1967 | Blakeley et al. | 285/112 X |
| 3,761,149 | 9/1973 | Blakeley | 285/373 X |
| 3,966,237 | 6/1976 | Thiesson | 285/373 X |
| 4,522,434 | 6/1985 | Webb | 285/373 X |
| 4,664,422 | 5/1987 | Straub | 285/373 X |

FOREIGN PATENT DOCUMENTS

| | | | |
|---|---|---|---|
| 0659303 | 3/1963 | Canada | 285/373 |
| 0064127 | 10/1955 | France | 285/373 |
| 0180042 | 7/1962 | Sweden | 285/373 |
| 0858368 | 1/1961 | United Kingdom | 285/112 |

Primary Examiner—Dave W. Arola
Assistant Examiner—Carol I. Bordas
Attorney, Agent, or Firm—Cahill, Sutton & Thomas

[57] ABSTRACT

Each half of a bifurcated circumferential clamp includes a pair of spaced apart internally oriented semicircular ridges for engaging grooves formed at the end of abutting pipes. Teeth extending adjacent the ridges penetrate the groove walls to physically lock the clamp with the pipes. A circular gasket bridging the abutting pipes and held in place by the clamp seals the junction between the pipes.

3 Claims, 2 Drawing Sheets

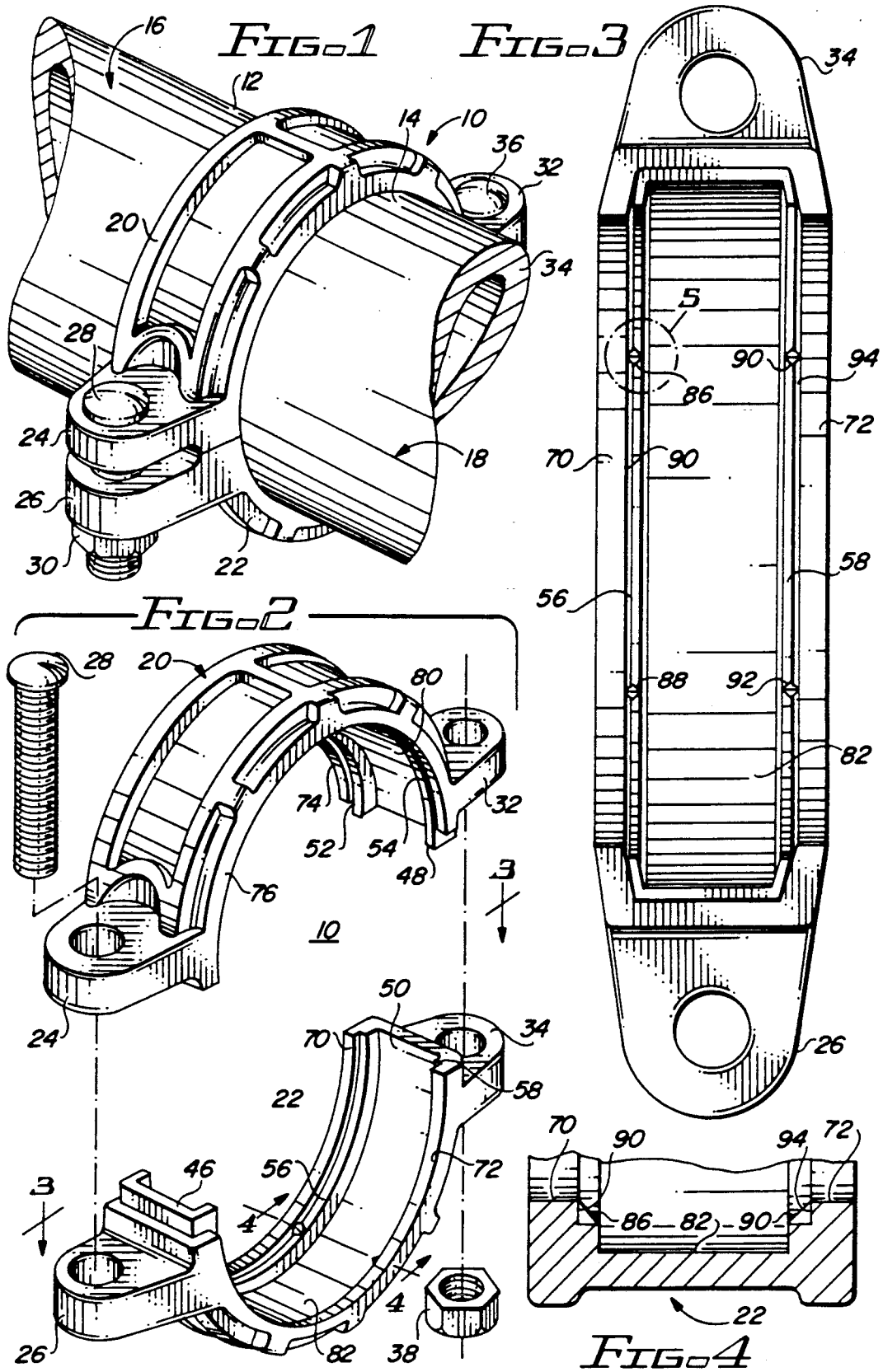

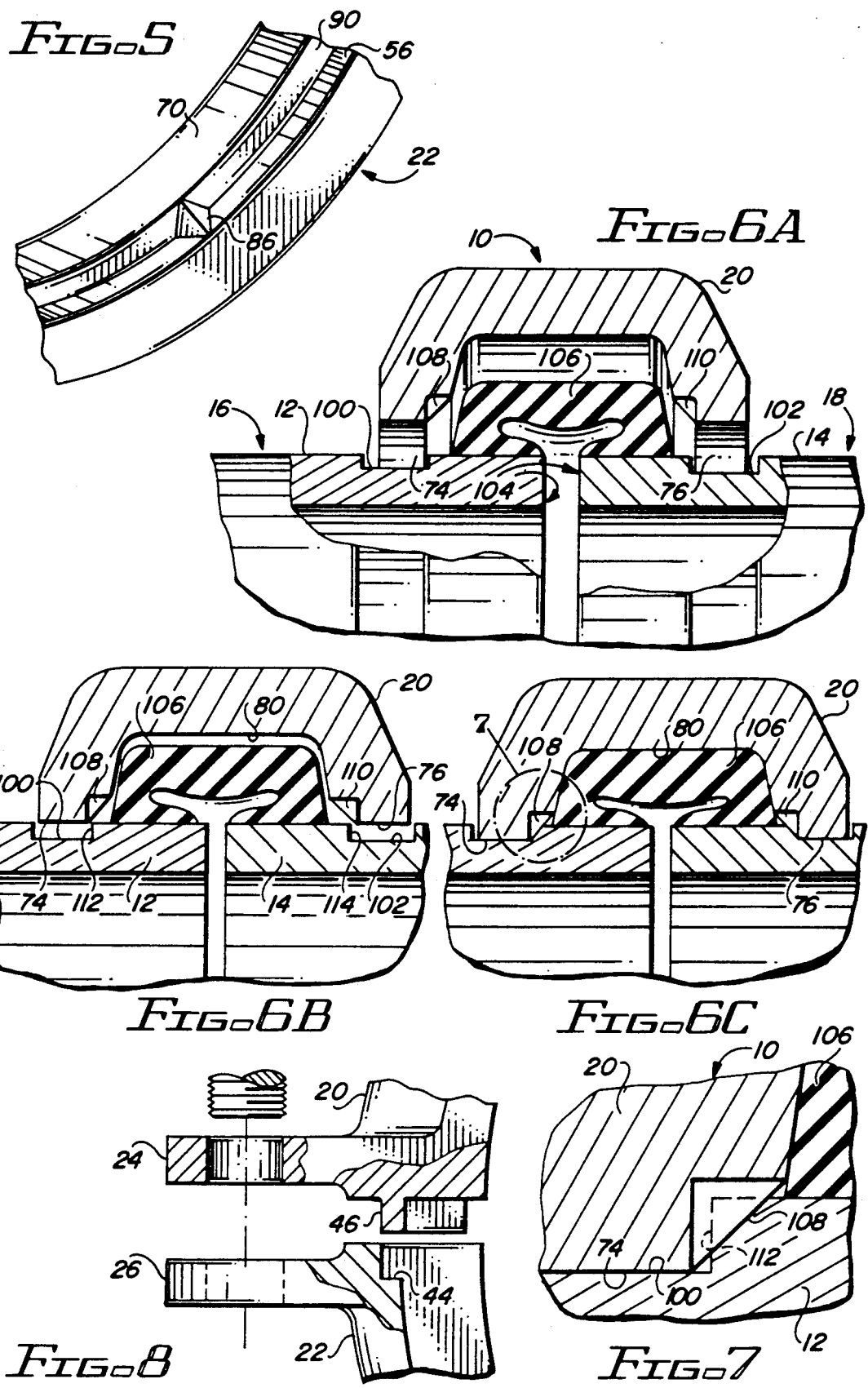

CLAMP WITH TEETH FOR GROOVED PIPES

This is a continuation of application Ser. No. 277,005 filed Nov. 28, 1988.

BACKGROUND OF THE INVENTION

1. Field of the Invention

The present invention relates to couplings or clamps for joining pipes and, more particularly, to clamps for rigidly securing grooved pipes end to end.

2. Description of Prior Art

For years, two part clamps have been used for securing the ends of pipes to one another. These clamps are generally two part clamps wherein each part engages half of the circumference of the joined pipes. The pipes are formed with annular grooves for receiving internally oriented ridges of the clamp halves. A circular gasket bridges the joined pipe ends and is retained in place by the clamp to seal the pipe junction. Longitudinally oriented separation between the abutting pipes is generally prevented by the interference fit resulting from the ridges of the clamp engaging the grooves in the pipes. Rotational displacement of the pipes about the longitudinal axis is generally prevented by and a function of the clamping force and friction between the clamp and the pipe ends. The two clamp halves are secured to one another by a pair of diametrically opposed bolts and nuts penetrably engaging mating bolting pads extending laterally from the respective clamp halves. The clamps may be manufactured to clamp specifically sized pipes having specifically sized depth of grooves; with these known factors, the bolting pads can be configured to be adjacent one another when the clamp is secured in place. Thereby, the clamp will represent a continuous ring about the ends of the pipes to substantially immobilize them and eliminate all gaps between the clamp and the encircled pipe ends. Unfortunately, the pipe ends are sometimes undersize or oversize. Additionally, the depth of the pipe grooves may be more or less than standard. Under such circumstances, the bolting pads may be drawn adjacent one another by nut and bolt means and make contact before the encircled ends of the pipes are securely clamped therebetween. The resulting fit will be too loose to immobilize the pipe ends. Alternatively, the bolting pads may not be capable of being drawn adjacent one another by the nut and bolt means due to oversize of the ends of the pipes or due to lack of sufficient depth within the grooves at the pipe ends. The resulting gap between the bolting pads will provide a source for movement between the clamp halves as a result of forces imposed by the joined pipes. This situation may cause a hazard and is generally considered unsatisfactory.

A presently employed solution for accommodating variances in the ends of pipes to be joined and the grooves formed therein is that of setting the abutting surfaces of the bolting pads at an angle. Necessarily, the holes through which the bolt and nut means extend must be elongated to accommodate movement of the respective clamp halves along the longitudinal axis of the joined pipes. On drawing the bolting pads toward one another, they will slide in contact with one another until further tightening ceases. This configuration has the benefit of permitting the clamp halves to be drawn toward one another until a tight fit with the joined ends of the pipes is achieved. However, the clamp halves will not be located in a common plane and asymmetrical loading upon the ends of the pipes may occur. Moreover, the sliding movement of the clamp halves during tightening may have detrimental effects upon the integrity and seal of the circular gasket bridging the joined ends of the pipes.

Clamps of the type described above rely upon a tight fit and friction to immobilize the joined pipes with one another. Because the friction is a function of the torque applied to the bolt and nut means drawing the two clamps halves toward one another, non uniformity between installed clamps may result. Torsional forces imposed between the joined pipes may be sufficient to overcome the friction imposed by the clamp and rotation of one pipe with respect to the other may result. Such rotation may cause stresses or strains upon other segments of the pipe network and failure may occur.

Numerous examples of clamps falling within the above enumerated categories exist and have existed for decades. Various modifications of configuration of the bolting pads are known. Moreover, various configurations of and materials used for the gasket retained in place by the clamp are well known.

The present invention was developed particularly for the purpose of preventing rotation of one pipe about its longitudinal axis with respect to a joined pipe. To obtain these results, a plurality of teeth are formed in each clamp half adjacent each of the opposed spaced apart pair of ridges. On tightening of the clamp about the joined ends of the pipes, the teeth interfere with and penetrably engage the anterior side wall of the groove in the encircled pipe. The resulting physical or mechanical interconnection operates in the manner of a key and keyway to prevent rotation of each pipe end with the encircling clamp. Accordingly, the resulting mechanical lock, in addition to friction, Will tend to discourage rotational motion between the joined pipes and about the longitudinal axis. For reasons not presently known, the interference fit between the teeth and the side Walls of the grooves tends to preclude displacement of the joined pipes along the longitudinal axis in response to high pressures wi thin the pipes. To accommodate for differences in pipe diameters and groove depth, a tongue and groove structure is employed in conjunction with the bolting pads to prevent gaps about the engaged pipes even though the bolting pads may not be drawable adjacent one another.

It is therefore a primary object of the present invention to provide a clamp for physically interlocking with the joined ends of apair of encircled pipes to prevent rotation between the pipes about their common longitudinal axis.

Another object of the present invention is to provide an interference fit about the longitudinal axis between a clamp on a pipe encircled by the clamp.

Yet another object of the present invention is to provide a clamp for mechanically interlocking with encircled pipes.

Yet another object of the present invention is to provide a plurality of teeth interior of a clamp for engaging a side wall of a groove in an encircled pipe.

Still another object of the present invention is to provide a plurality of teeth interior of a clamp for engaging a side wall of a groove formed in each end of a pair of joined pipes.

A further object of the present invention is to provide teeth on the interior surface of the ridge of a clamp for penetrably engaging the side wall of a groove of an encircled pipe.

A yet further object of the present invention is to provide a tongue and groove apparatus for avoiding a gap between bolting pads of a pipe clamp.

Still another object of the present invention is to provide a method for mechanically interlocking and frictionally engaging joined pipe ends with a clamp.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 1 is a perspective view illustrating a coupling or clamp for securing joined ends of a pair of axially aligned pipes;

FIG. 2 is an exploded view of a pair of clamp halves;

FIG. 3 is a top view taken along lines 3—3 as shown in FIG. 2;

FIG. 4 is a cross sectional view taken along lines 4—4, as shown in FIG. 2:

FIG. 5 is a detail view within circular line 5 shown in FIG. 3:

FIGS. 6A, 6B and 6C illustrate the initial, intermediate and final steps in attaching the clamp about the joined ends of a pair of pipes;

FIG. 7 is a detail view taken within circular line 7 shown in FIG. 6C; and

FIG. 8 is a partial cross sectional view illustrating the tongue and groove apparatus attendant the bolting pads.

DESCRIPTION OF THE PREFERRED EMBODIMENT

Referring to FIG. 1, there is illustrated a coupling or clamp 10 for engaging and immobilizing opposed ends 12, 14 of aligned pipes 16, 18. The clamp includes upper and lower clamp halves 20, 22, which may be mirror images of one another. Bolting pads 24, 26 of clamp halves 20, 22, respectively, are secured to one another by a bolt 28 in threaded engagement with a nut 30. Diametrically opposed bolting pads 32, 34 (not shown) extend from clamp halves 20. 22, respectively, and are secured to one another with bolt 36 and nut 38 (not shown). Each clamp half may include a plurality of external annular ridges and axial ribs to provide it with the requisite strength and stability while minimizing weight and mass of material.

Referring to FIGS. 2, 3, 4 and 5 further details of clamp 10 will be described. Due to variations in tolerance between pipes 16 and 18 and due to further variations in tolerance between clamp 10 and the pipes, some mechanism must be provided to maintain the clamp continuously in circumferential engagement with the circumscribed pipe ends to provide the greatest possible rigidity to the junction. That is, the respective pairs of bolting pads must be displaced from one another a sufficient degree to permit tightening of the clamp halves about the joined pipes Without having the bolting pads come in contact with one another before sufficient torque has been applied to the retaining bolt and nut. The resulting gap between the bolting pads must be compensated to maintain continuous circumferential contact with the encircled pipe ends. This capability is provided by tongue 46 extending from bolting pad 26 for engagement with a commensurately configured groove in bolting pad 24 of clamp half 20. Similarly, a tongue 48 extends from bolting pad 32 for penetrable engagement within a groove 50 disposed in or as part of bolting pad 34. As particularly noted with respect to clamp half 20, tongue 48, like tongue 46, is an extension of an internal pair of shoulders 52, 58 within clamp half 20. These shoulders are diametrically configured to mate with the peripheral annular surface of the engaged inscribed pipe. Similar shoulders 56, 58 are disposed in clamp half 22. A ridge extends radially inwardly along one side of clamp half 22 and a similar ridge 72 is disposed o the opposed side. These two ridges, in combination with similar ridges 74, 76 in clamp half 20, engage respective grooves in pipe ends 12 and 14. A central annular recess 80 is formed in clamp half 20 to receive and retain a gasket for bridging the junction between pipe ends 12 and 14 within clamp 10. A similar recess 82 is disposed in clamp half 22. Teeth 86, 88 extend from the upper surface of shoulder 56 to interior side wall 90 of ridge 70. These teeth may be tetrahedron like having an apex oriented at an angle of approximately 45° with respect to a radial of clamp half 22 a two triangular surfaces extending therefrom, as illustrated; alternatively, other configurations could be employed. Similar teeth 90, 92 extend from shoulder 58 to interior side wall 94 of ridge 72. The selection of configuration and size of teeth 86, 88, 90 and 92 must meet the criteria for interferingly engaging and thereby penetrating the anterior side wall of the corresponding groove in the pipe encircled by the clamp half Referring jointly to FIGS. 6A, 6B, 6C and 7, the attachment of clamp 10 to pipes 16 and 18 will be described. End 12 of pipe 16 includes an annular groove 100. Industry standards generally dictate the depth and width of such groove commensurate with the diameter of the pipe. A similar groove 102 is disposed in end 14 of pipe 18. To secure pipes 16 and 18 with one another, they are aligned with one another along their respective longitudinal axes and spaced apart from one another to define a predetermined gap 104 therebetween. During the alignment process, an annular gasket 106 is placed about the opposed ends of the pipes in bridging relationship to cover gap 104. Clamp halves 20, 22 are placed about the junction of the two pipes to locate ridges 74, 76 in grooves 100, 102. Clamp half 20 is similarly placed about the pipes to locate ridges 70, 72 in the second half of grooves 100, 102. Upon tightening the nuts upon the bolts extending through the paired bolting pads, the clamp halves will be drawn toward one another, as illustrated in FIG. 6B. During such tightening, gasket 106 will be forced into recess 80 and squeezed against encircled pipe ends 12, 14 to form a seal about the junction. As ridge 74 begins penetration of groove 100 and ridge 76 begins penetration of groove 102, teeth 108, 110 (like teeth 86, 88, 90 and 92 described above) interferingly engage side Walls 112, 114, of grooves 100 and 102, respectively. In the normal environment of clamp 10 and pipes 16, 18, the clamp is of material having a greater hardness than that of the pipes. The interference between teeth 108, 110 with side walls 112, 114, respectively, results in indentation or deformation of the side walls to accommodate the penetrably engaging teeth. This penetrable engagement is particularly illustrated in FIGS. 6 and 7 showing clamp 10 in the final stage of being secured about the pipes.

The mechanical interference created by the teeth with the commensurate side wall of the groove creates a mechanical interlock not unlike a conventional key and keyway, as shown in FIG. 7. This interference Will create a mechanical obstruction against relative rotation about the longitudinal axis of the clamped pipe With respect to the clamp. Thereby, a physical impediment Will exist to prevent rotation of each of pipes 16, 18 with respect to clamp 10; hence, resistance to rotation of the pipes with respect to one another about their common longitudinal axes Will also be created.

Referring to FIG. 8, there is illustrated in further detail the bridging feature provided by tongue 46 extending downwardly from bolting pad 24 into engagement with groove 44 formed as part of bolting pad 26. That is, a substantial gap may exist between the bolting pads before a tongue disengages from its groove to form a discontinuity or gap between the respective clamp halves 20, 22 adjacent a circumscribed pipe junction. Furthermore, groove 44 is of sufficient depth to permit receiving all of tongue 46 before the opposed surfaces of bolting pads 24 and 26 will abut one another. The tongue and groove configuration also has a further benefit of tending to prevent extrusion of gasket 106 between the bolting pads during tightening by torquing the bolt and nut means to secure the clamp in place.

A presently commercially available clamp manufactured by Victaulic Company of America includes bolting pads having opposed slanted surfaces for accommodating tightening of the clamp about a pair of joined pipe ends. A particularly beneficial feature of such bolting pads is that a substantial variation in pipe size, groove depth and clamp size can be accommodated. These clamps are sold in the same market as that of the present invention for essentially the same purposes. To determine the benefits of the teeth formed in the clamp halves, as described herein, a number of tests were made to compare the present invention with an equivalently sized clamp made by the Victaulic Company of America. In particular, a four inch clamp constructed in accordance with the present invention (referred to as 4" No. 120) was compared with a four inch clamp of the Victaulic Company of America (referred to as a Vic 4).

In a test to determine lineal line expansion with a schedule 40 cut groove pipe having an internal pressure of 750 p.s.i., the expansion recorded by two diametrically opposed gauges was 0.026" and 0.040" for a 4" No. 120 clamp and 0.025" to 0.036" for the Vic 4 clamp. In a second test using a schedule 10 rolled groove pipe having an internal pressure of 600 p.s.i., the expansion was 0.072" and 0.059" for a 4" No. 120 clamp and 0.031" to 0.030" for a Vic 4 clamp.

In a deflection test for a schedule 40 cut groove pipe having zero internal pressure with a bending force of 2513 lb.ft. the pipe moved 1° on each side of a 4" No. 120 clamp and for a Vic 4 clamp, one side moved 1.5° and the other side moved 1°. For a schedule 40 cut groove pipe having zero internal pressure With 5026 lb.ft. force applied, each side of a 4" No. 120 clamp deflected 1.5° and for a Vic 4 clamp one side deflected 2° and the other side deflected 1.5°. For a schedule 40 cut groove pipe having an internal pressure of 500 p.s.i., a deflecting force of 2513 lb.ft. caused each side to move ½° for a 4" No. 120 clamp and each side moved 1° for a Vic 4 clamp. For a schedule 40 cut groove pipe having an internal pressure of 500 p.s.i. with a 5026 lb.ft. deflecting force, each side of a 4" No. 120 clamp moved 1° while for a Vic 4 clamp, each side deflected 2°.

In rotational testing, a 4" No. 120 clamp mounted on schedule 40 cut groove pipes having zero internal pressure required a rotational force of 703 lb.ft. before movement occurred. Under similar conditions, a Vic 4 clamp permitted rotation after application of a force of 452 lb.ft. For a schedule 40 cut groove pipe having an internal pressure of 500 p.s.i., 4" No. 120 clamp withstood rotational movement until the rotational force exceeded 1507 lb.ft. Under the same conditions, a Vic 4 clamp could only resist a rotational force of 754 lb.ft.

Hydrostatic burst to failure was also tested. Using a 4" No. 120 clamp on a schedule 10 pipe having a rolled groove, the pipe ruptured at a pressure of 2700 p.s.i. For a schedule 40 cut groove pipe, the end cap blew out on application of 4200 p.s.i. For a schedule 40 rolled groove pipe having welded end caps, a half inch plate Welded on one end blew out at a pressure of 4300 p.s.i. For a schedule 40 cut groove pipe, the clamp failed at a pressure of 4500 p.s.i. Using a Vic 4 clamp, a schedule 10 rolled groove pipe failed at a pressure of 1950 p.s.i. since the pipe was pushed out of the clamp. For a schedule 40 cut groove pipe having a Vic 4 clamp, the pipe pushed out of the clamp on application of a force of 2700 p.s.i. For a schedule 40 rolled groove pipe, the pipe pushed out of a Vic 4 clamp at a pressure of 2650 p.s.i.

The substantially superior results from rotational resistance testing of the present invention over a comparable commercially available clamp of the same size are readily understandable. However, the reasons for the additional benefits and improved resistance to displacement of the present invention resulting from the teeth having an apparent ability to prevent longitudinal disengagement of a pipe from the clamp are not fully understood. The substantially higher pressures during hydrostatic testing accommodated by the present invention over that of a comparable clamp not having the teeth are significant.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirement without departing from those principles.

I claim:

1. A pipe clamp for drawing the ends of a pair of aligned pipes toward one another and for joining them with one another, each of the pipes including an annular groove having an annular base and opposed radially oriented side walls formed proximate the end of the pipe and extending inwardly from the surface of the pipe, said pipe clamp comprising in combination:

(a) a first clamp half for encircling approximately one half of the joined pipes and extending across the junction therebetween;

(b) a second clamp half for encircling approximately the other half of the joined pipes and extending across the junction therebetween;

(c) means for securing said first and second clamp halves to one another and about the joined pipe ends;

(d) a pair of arcuate ridges formed in axially opposed halves of each of said first and second clamp halves extending radially inwardly therefrom for engaging the grooves in the respective pipe ends, each of said ridges including a extending radially with respect to the longitudinal axis of the respective clamp half facing inwardly toward the axial center of the respective clamp half and an annular shoulder extending perpendicularly from said inwardly facing side wall; and (e) teeth means extending from each of said ridges for penetrably engaging simultaneously one of the side walls of the groove in the pipe and the surface of the pipe adjacent the engaged side wall, each of said teeth means including an apex extending from said side wall of said ridge to said adjacent annular shoulder extending from said ridge inwardly toward the axial center of the respective clamp half, each of said teeth means having a triangular cross section in a plane transverse to said apex; whereby, upon penetration of said apex simultaneously into the side wall of the pipe groove and the surface of the pipe, each of said teeth means urges the engaged pipe axially toward the junction of the pair of pipes and simultaneously exerts a radial inward force upon the engaged pipe commensurate with securing said first and second clamp having to one another and about the joined pipe ends.

2. The pipe clamp as set forth in claim 1 wherein said teeth means comprises at least two teeth disposed in spaced apart relationship on each of said ridges of each of said clamp halves.

3. The pipe clamp as set forth in claim 1 wherein said apex of each of said teeth means is oriented at an angle of approximately 45° with respect to the side wall of the respective one of said clamp halves and is disposed in a plane passing through the longitudinal axis of the respective one of said clamp halves.

* * * * *

UNITED STATES PATENT AND TRADEMARK OFFICE
CERTIFICATE OF CORRECTION

PATENT NO. : 5,058,931
DATED : October 22, 1991
INVENTOR(S) : Mark A. Bowsher

It is certified that error appears in the above-identified patent and that said Letters Patent is hereby corrected as shown below:

Column 6, line 63:

In Claim 1, paragraph d), line 5, after "including a", insert --side wall--.

Signed and Sealed this

Twentieth Day of July, 1993

Attest:

MICHAEL K. KIRK

Attesting Officer

Acting Commissioner of Patents and Trademarks